Feb. 26, 1952 W. F. WRIGHT 2,587,265
VEHICLE RAMP
Filed Dec. 12, 1949 3 Sheets-Sheet 1
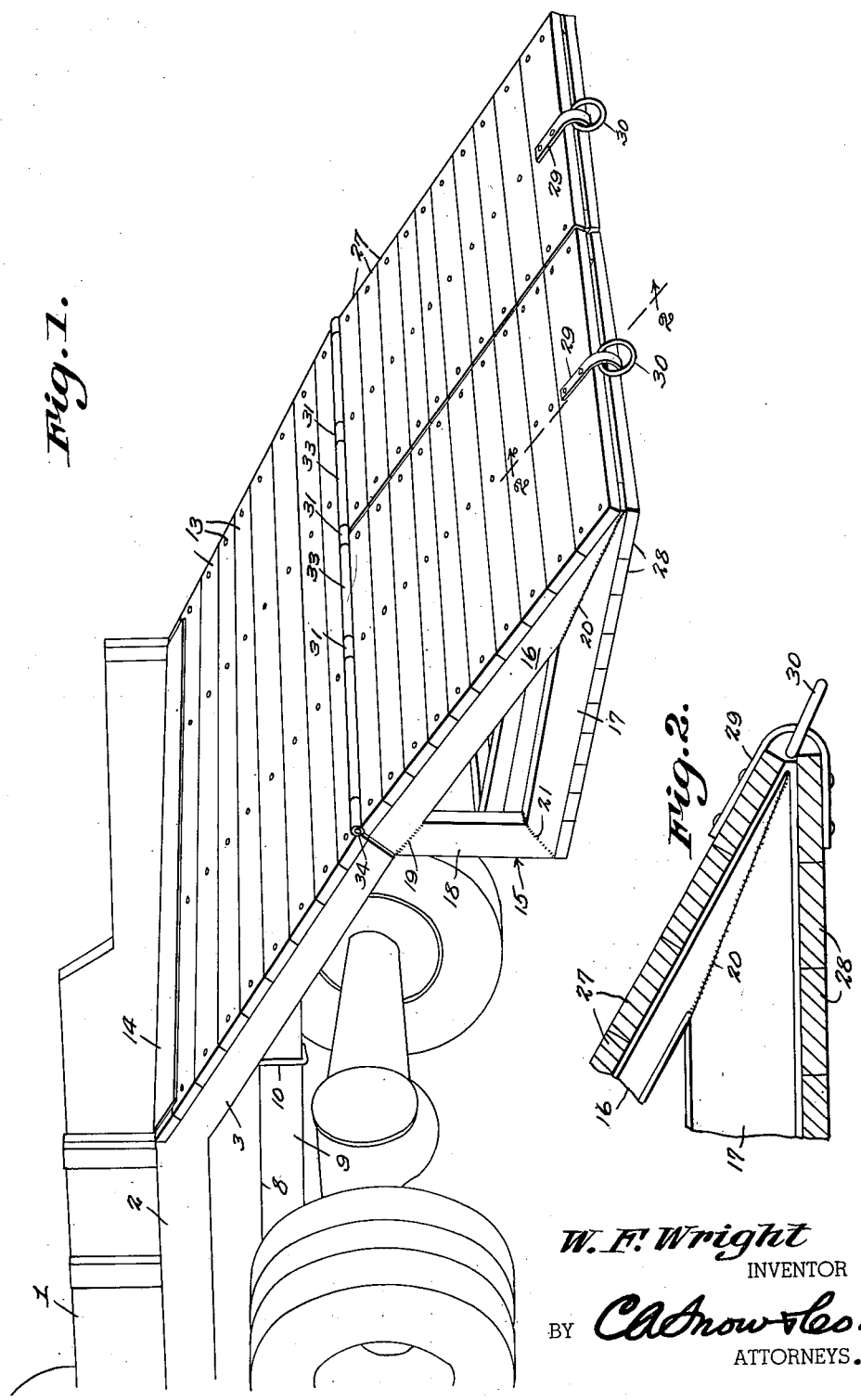
W. F. Wright
INVENTOR
BY C. A. Snow & Co.
ATTORNEYS.

Feb. 26, 1952     W. F. WRIGHT     2,587,265
VEHICLE RAMP
Filed Dec. 12, 1949     3 Sheets-Sheet 2
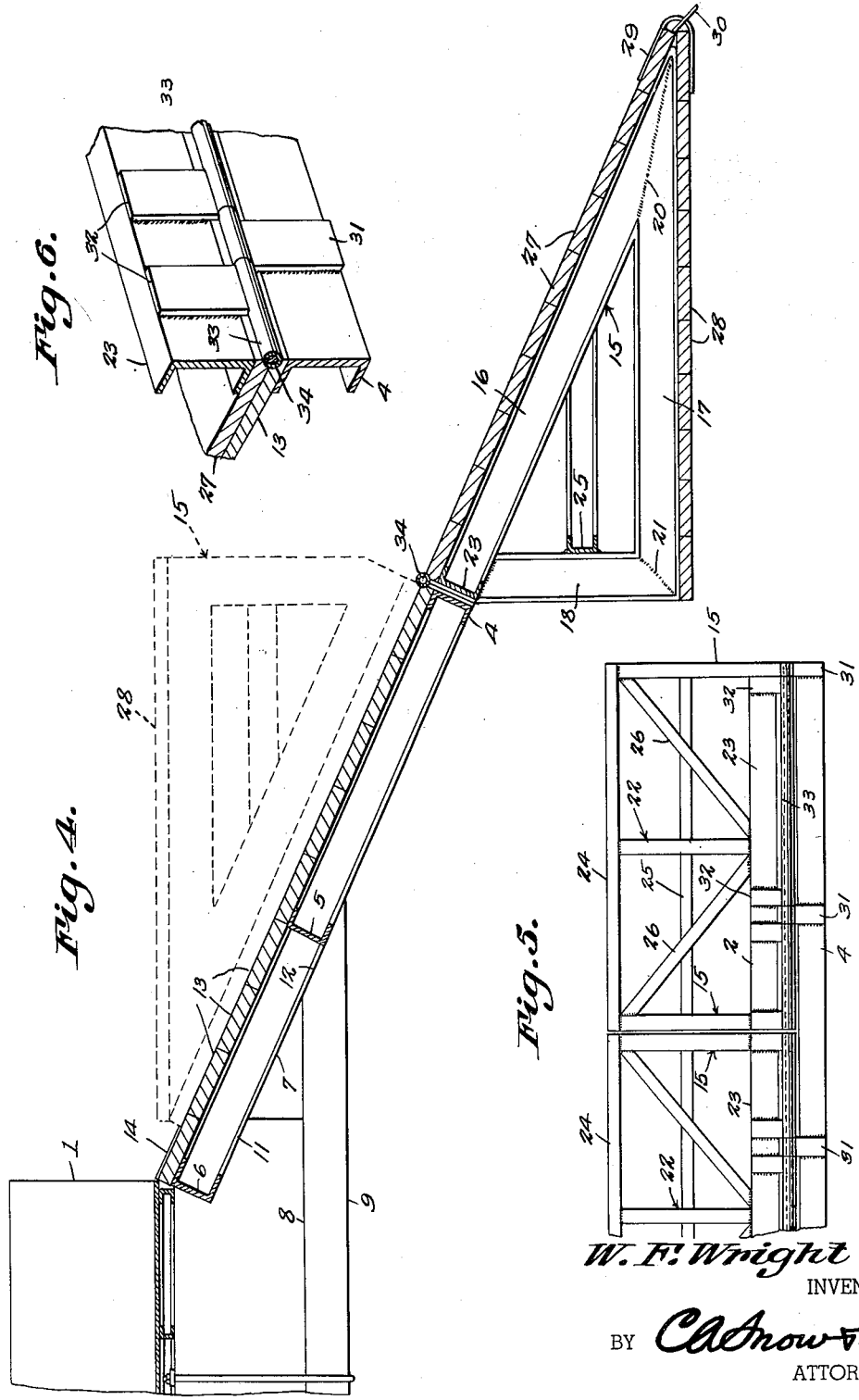
W. F. Wright
INVENTOR
BY C. A. Snow & Co.
ATTORNEYS.

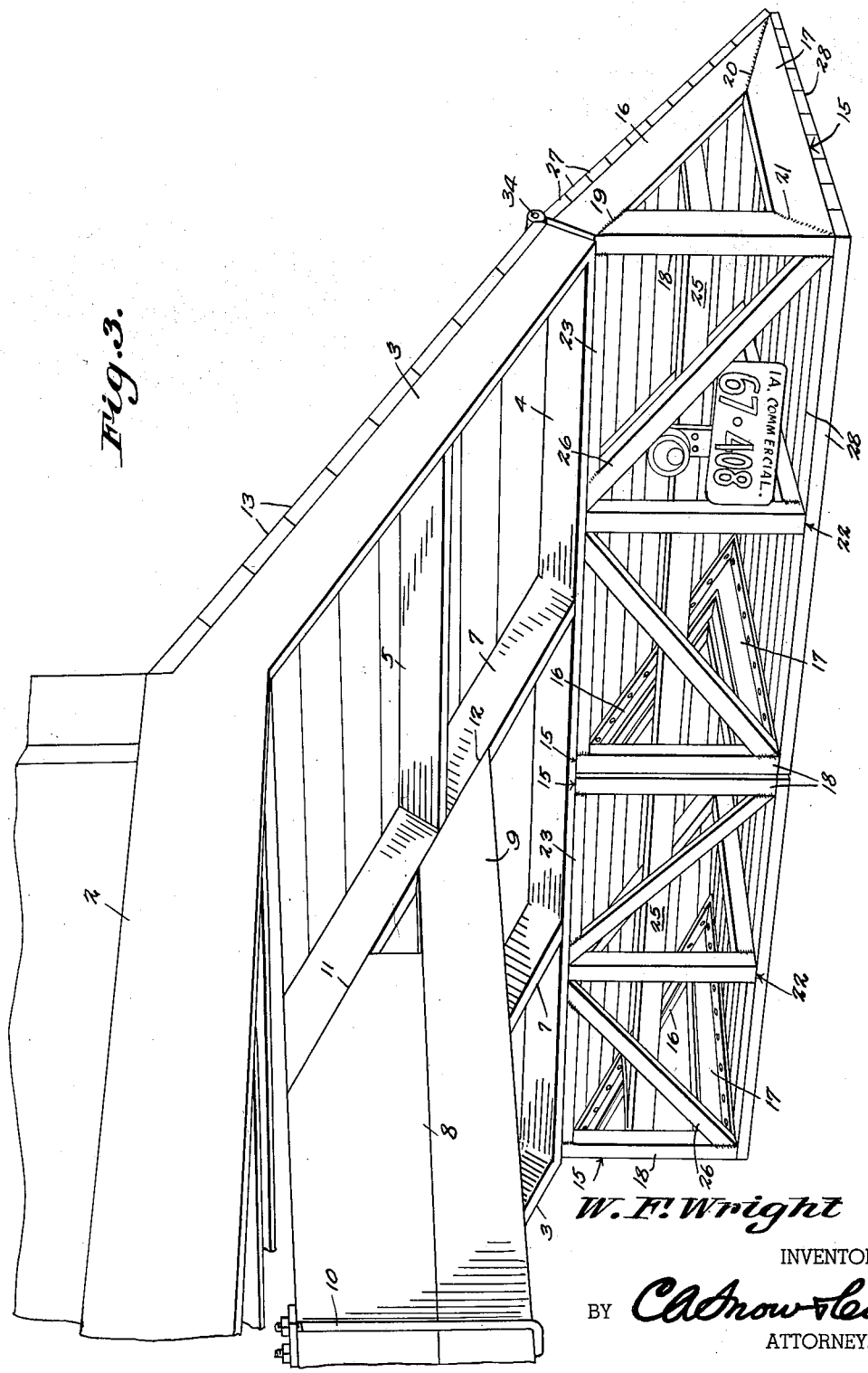

Patented Feb. 26, 1952

2,587,265

UNITED STATES PATENT OFFICE 2,587,265

VEHICLE RAMP

Walter F. Wright, Onawa, Iowa

Application December 12, 1949, Serial No. 132,611

2 Claims. (Cl. 214—85)

This invention relates to ramp construction, and more particularly, has reference to a vehicle-mounted ramp.

By way of background, it may be noted that in the transportation, by truck, of such equipment as tractors, farm machinery, or the like, the loading or unloading of the truck has heretofore been attended by considerable difficulty and inconvenience. It has been necessary to use a portable loader or trailer which has had to be transported to each location at which loading or unloading is to take place.

An important object of the present invention is to eliminate the necessity of using portable loaders or trailers, through the provision of a foldable ramp attached to the truck itself.

Another important object is to provide a ramp as described which, when folded, folds into the plane of the truck bed, so as to interfere in no way with the driving of the truck from place to place, and so as further to provide, in effect, an extension of the truck bed itself.

Yet another object is to provide a ramp as described which, when unfolded, provides a sturdy inclined ramp extending directly from the bed of the truck to the ground, for loading or unloading of the articles to be carried, which articles can be exceptionally heavy, as for example tractors, without in any way weakening the truck body or ramp.

Still another object is to provide a ramp construction as stated which can be attached to any conventionally designed truck.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 1 is a perspective view of a ramp formed in accordance with the invention as it appears when lowered.

Fig. 2 is a fragmentary enlarged detail section taken substantially on line 2—2 of Fig. 1.

Fig. 3 is a bottom perspective view of the lowered ramp.

Fig. 4 is a vertical section taken longitudinally through the lowered ramp, the dotted lines indicating the folded position of the ramp.

Fig. 5 is a fragmentary rear elevational view of the folded ramp.

Fig. 6 is an enlarged fragmentary perspective view showing the detail of the hinge construction.

Referring to the drawings in detail, 1 is any conventional truck, generally a flat bed truck such as used for the transportation of heavy equipment. This is equipped with the side frame members 2 extending longitudinally of the opposite sides of the flat bed body of the vehicle.

Rigidly secured to the rear ends of the side frame members 2 in any suitable manner, as for example by being formed integrally therewith, and inclined downwardly and rearwardly from said members 2, are the longitudinal frame members 3 of the fixed ramp section. At their rear ends the members 3 are rigidly connected by the rear transverse frame members 4. Intermediate their ends, the members 3 are rigidly connected by transverse brace members 5, and at their front ends the members 3 are rigidly connected by the front transverse frame members 6. The fixed ramp frame can be further braced by other longitudinal frame members 7 intermediate the opposite sides of said fixed ramp frame.

Supporting the upper and medial portions of the longitudinal frame members 7 of the downwardly inclined fixed ramp frame are the horizontally extended, superposed center beams 8 and 9 mounted below the truck bed, these being rigidly connected by U-clamps 10 or equivalent fastening means, the members 8 and 9 having angularly cut away rear ends underlying the frame members 7.

From the above, it will be seen that I provide as an attachment to the rear end of a truck or similar vehicle a fixed ramp frame that is inclined downwardly and rearwardly from, and is rigidly secured to, the truck body. This ramp frame, as best seen from Figs. 1 and 3, extends at an angle of approximately 45 degrees halfway from the truck bed to the ground.

After forming a box-like downwardly inclined fixed ramp frame as described above, I cover said ramp frame with planking 13, and at the joint between said planking and the bed of the truck itself, an iron wear plate 14 can be provided.

I hingedly connect to the rear end of the fixed ramp section one or more movable ramp sections which in cross section are triangular as best seen from Figs. 1, 3, and 4. In the present case, as readily seen from Fig. 1, two of said movable ramp sections are provided, for ease in folding or unfolding of the ramp. However, a single movable ramp section can be used extending the full width of the ramp if desired.

In any event, each movable or hinged lower ramp section is provided with triangular end frames generally designated 15, each end frame comprising members 16, 17, and 18 rigidly joined by weld seams 19, 20, and 21 to provide the triangular end frame construction desired.

Bracing the medial portions of the respective hinged ramp sections are the triangular middle frames 22 formed in the same manner as the end frames. Extending transversely of each movable ramp frame and rigidly secured to the respective end and middle frames are the cross beams 23 and 24 respectively. Horizontal braces 25 and angular braces 26 complete the formation of each hinged or movable ramp section.

After the frames of the hinged or movable ramp sections have been formed as described above, planking 27 is applied to the inclined side of each hinged ramp frame, while planking 28 is applied to the bottom of each frame.

For convenience in lifting or dropping the hinged ramp sections, iron straps 29 are secured thereto and carry gripping rings 30.

Referring now to the means employed in the present instance to connect the fixed ramp section to the respective movable ramp sections, I secure at spaced intervals transversely of the cross member 4 at the rear end of the fixed ramp section, straps 31 bent at their ends to provide hinge members. Pairs of straps 32 are secured to the members 23 of the hinged ramp frames, and each pair of hinge straps 32 is rigid with an elongated tubular hinge member 33. A hinge pin 34 extending the full width of the ramp extends through the respective hinge members, so as to provide, in effect, a type of piano hinge connection.

Referring now to Fig. 4, the position of the hinged ramp sections when folded is illustrated in dotted lines. In this position, it will be seen that the planking 28 of the hinged ramp sections is in the plane of the bed of the truck 1, and this planking constitutes an extension of said truck bed.

When the truck is to be loaded or unloaded, each hinged ramp section is simply swung upon the hinge connection, to the full line position illustrated in Figs. 1, 3, and 4. This positions the planking 27 in the inclined plane of the fixed ramp section, so as to provide a continuous inclined surface extending from the truck bed to the ground, on which surface tractors or other heavy equipment can be driven, or otherwise moved, so as to load or unload the truck.

When the hinged ramp sections are moved to their operative positions illustrated in full lines in the drawing, it will be observed that they are supported upon the ground not only at their rear ends, but throughout their bottom areas, and this assists in supporting the fixed ramp frame under the heavy weight of objects being loaded or unloaded. In this connection, there can be, normally, a slight clearance between the planking 28 and the ground surface, to permit the swinging of the hinged ramp sections in an arc in adjustment of said hinged sections to folded or unfolded positions respectively.

What is claimed is:

1. In a ramp for attachment to a vehicle body, parallel, inclined, longitudinal side and intermediate frame members, horizontal side frame members extending longitudinally of opposite sides of said body, said inclined side members merging into and being integral with said horizontal members, superposed center beams mounted on said body below the plane of said horizontal members and extended longitudinally of said truck body between opposite sides thereof, said center beams having angularly cut away ends supporting said inclined intermediate members, said intermediate and side inclined members being covered to define a stationary ramp section, and a second ramp section movably connected to the first-named section, said sections adapted to provide a continuous inclined surface extending from said vehicle body for loading or unloading of objects to be carried by said vehicle body.

2. In a ramp for attachment to a vehicle body, parallel, inclined, longitudinal side and intermediate frame members, horizontal side frame members extending longitudinally of opposite sides of said body, said inclined side members merging into and being integral with said horizontal members, superposed center beams mounted on said body below the plane of said horizontal members and extended longitudinally of said truck body between opposite sides thereof, said center beams having angularly cut away ends supporting said inclined intermediate members, said intermediate and side inclined members being covered to define a stationary ramp section, said ramp section terminating a considerable distance above a supporting surface for said vehicle body, and at least one movable ramp section hingedly connected to the rear end of said stationary section, said movable ramp section being of approximately triangular cross section and being swingable to extreme positions in which, respectively, it comprises an extension of the truck body and is supported upon the stationary section, and, in its other extreme position, comprises an extension of the inclined stationary ramp section to provide a continuous ramp extending from the vehicle body to a supporting surface.

WALTER F. WRIGHT.

REFERENCES CITED

The following references are of record in the file of this patent:

UNITED STATES PATENTS

| Number | Name | Date |
|---|---|---|
| 2,436,467 | Winter | Feb. 24, 1948 |
| 2,437,479 | Price | Mar. 9, 1948 |
| 2,486,189 | McCormick | Oct. 25, 1949 |